(12) United States Patent
Moon et al.

(10) Patent No.: US 6,394,189 B1
(45) Date of Patent: May 28, 2002

(54) ZERO GRAVITY ROBOTIC SYSTEM AND METHOD FOR USING SAME

(75) Inventors: Whitney J. Moon, Davenport, IA (US); Brian C. Gorge, Rock Island, IL (US)

(73) Assignee: Genesis Systems Group, Ltd., Davenport, IA (US)

(*) Notice: Subject to any disclaimer, the term of this patent is extended or adjusted under 35 U.S.C. 154(b) by 0 days.

(21) Appl. No.: 09/478,226

(22) Filed: Jan. 6, 2000

(51) Int. Cl.[7] .................................................. E21B 1/14
(52) U.S. Cl. .......................... 173/1; 173/104; 173/171; 901/21
(58) Field of Search .............................. 173/1, 42, 104, 173/171, 193; 409/131, 132, 138, 201, 211, 216; 901/21, 48

(56) References Cited

U.S. PATENT DOCUMENTS 4,993,196 A * 2/1991 Kobayashi et al. ........... 51/281
5,581,166 A * 12/1996 Eismann et al. ....... 318/568.22

* cited by examiner

Primary Examiner—Scott A. Smith
Assistant Examiner—Chukwurah Nathaniel
(74) Attorney, Agent, or Firm—McKee, Voorhees & Sease, P.L.C.

(57) ABSTRACT

A zero gravity robotic tool includes a robotic arm having a distal end. A motor is mounted on the distal end of the robotic arm and is rotated about a motor axis which passes through the center of gravity of the motor and the tool. A prime mover is connected to the robotic arm and to a pivot mechanism for causing the rotation of the motor and the tool about the motor axis.

19 Claims, 4 Drawing Sheets

ZERO GRAVITY ROBOTIC SYSTEM AND METHOD FOR USING SAME

BACKGROUND OF THE INVENTION

The present invention relates to a zero gravity robotic system and method for using same.

Material removal or deburring of work pieces has recently become a desirable application for industrial robots. Traditionally deburring has been a manual process due to all of the variables that must be controlled. Some of these variables include the selection of the abrasive to be used, the spindle speed of the tool, the contact angle of the tool against the work piece, and the force applied between the tool and the work piece.

In the case of robotic application of the tool to the work piece, it is important to maintain a precise control of the pressure of the tool against the part. However, with present systems, the movement of the robot often orients the tool in a way that causes gravity to act differently upon the tool. The effect of gravity can change the pressure of the tool against the work piece.

Most force devices presently available incorporate a spring or air cylinder component attached to a linear slide. When the linear slide is horizontally oriented, gravity has a negligible effect upon the magnitude of the force. However, when the tool is tipped gravity affects the magnitude of the force.

FIGS. 3A and 3B illustrate this phenomenon. In FIG. 3A, the force is applied horizontally against the work piece, and the effect of gravity is negligible.

However, in FIG. 3B, when the tool is tilted 30°, the net force on the work piece is the force applied by the slide plus gravity multiplied by the sine of 30°.

Thus in the linear slide application, gravity changes the net force which is applied to the work piece, depending upon the orientation of the tool with respect to gravity.

While this problem is encountered with deburring devices which utilize a rotating brush to remove burrs or foreign material from the work object, the problem also occurs in other types of robotic applications. For example it can occur during the application of a heat weld where the tool is pressed against the work piece. Another example is the application of pressure from a rotating drilling bit to the work piece. Another example would be the pressure applied during riveting. There are many other applications where the pressure between the tool and the work piece must be carefully controlled, and in these applications it is necessary to neutralize the effect of gravity on that pressure. Therefore a primary object of the present invention is the provision of a zero gravity robotic system that neutralizes the effect of gravity upon the pressure between the tool and the work piece.

A further object of the present invention is the provision of a zero gravity robotic system which operates rotationally around the center of gravity of the tool motor and which can be tipped at an angle without gravity affecting the force between the tool and the work piece.

A further object of the present invention is the provision of a zero gravity robotic system which utilizes a rotational motion to apply force between the tool and the work piece rather than a linear motion as in prior art devices.

A further object of the present invention is the provision of a zero gravity robotic system which utilizes a spring as a counterbalance to improve reaction sensitivity at low contact forces between the tool and the work piece.

A further object of the present invention is the. provision of a zero gravity robotic system which is economical to manufacture, durable in use and efficient in operation.

SUMMARY OF THE INVENTION

The foregoing objects may be achieved by a combination which includes a robotic arm having a distal end. Mounted on the distal end of the robotic arm is a motor having a rotatable arbor and a tool mounted to the arbor for rotation therewith about a tool axis. A pivot mechanism connects the motor and the tool to the distal end of the robotic arm for rotation about a motor axis which passes approximately through the center of gravity of the motor and the tool. A prime mover is connected to the distal end of the robotic arm and to the pivot mechanism for creating a rotational force to cause the pivotal movement of the motor about the motor axis. This results in the force of gravity having negligible effect upon the rotational force applied to the tool regardless of the orientation of the motor with respect to gravity.

According to one feature of the invention the tool axis is oriented perpendicular to the motor axis.

According to another feature of the invention the pivot mechanism comprises a lever member pivotally connected to the distal end of the robotic arm for rotation about the motor axis. A lever member is also attached to the motor.

According to another feature of the invention the prime mover is a fluid cylinder having an extensible rod. However, other types of prime movers could be used.

According to another feature of the invention a spring is attached to the pivot mechanism and the distal end of the robotic arm and provides a counterbalancing force to the force exerted by the fluid cylinder and the extensible rod.

The foregoing objects may be achieved by a method of rotatably mounting a motor having a work tool thereon to the distal end of a robotic arm for rotation about a motor axis which passes through the approximate center of gravity of the motor and the tool. A predetermined rotational force is applied to the motor and the work tool to cause the motor and the work tool to rotate about the motor axis whereby the passing of the motor axis through the approximate center of gravity will cause gravity to have a negligible effect upon the predetermined rotational force applied to the tool regardless of the orientation of the motor and the tool with respect to gravity.

DETAILED DESCRIPTION OF THE PREFERRED EMBODIMENT

Figure 1:
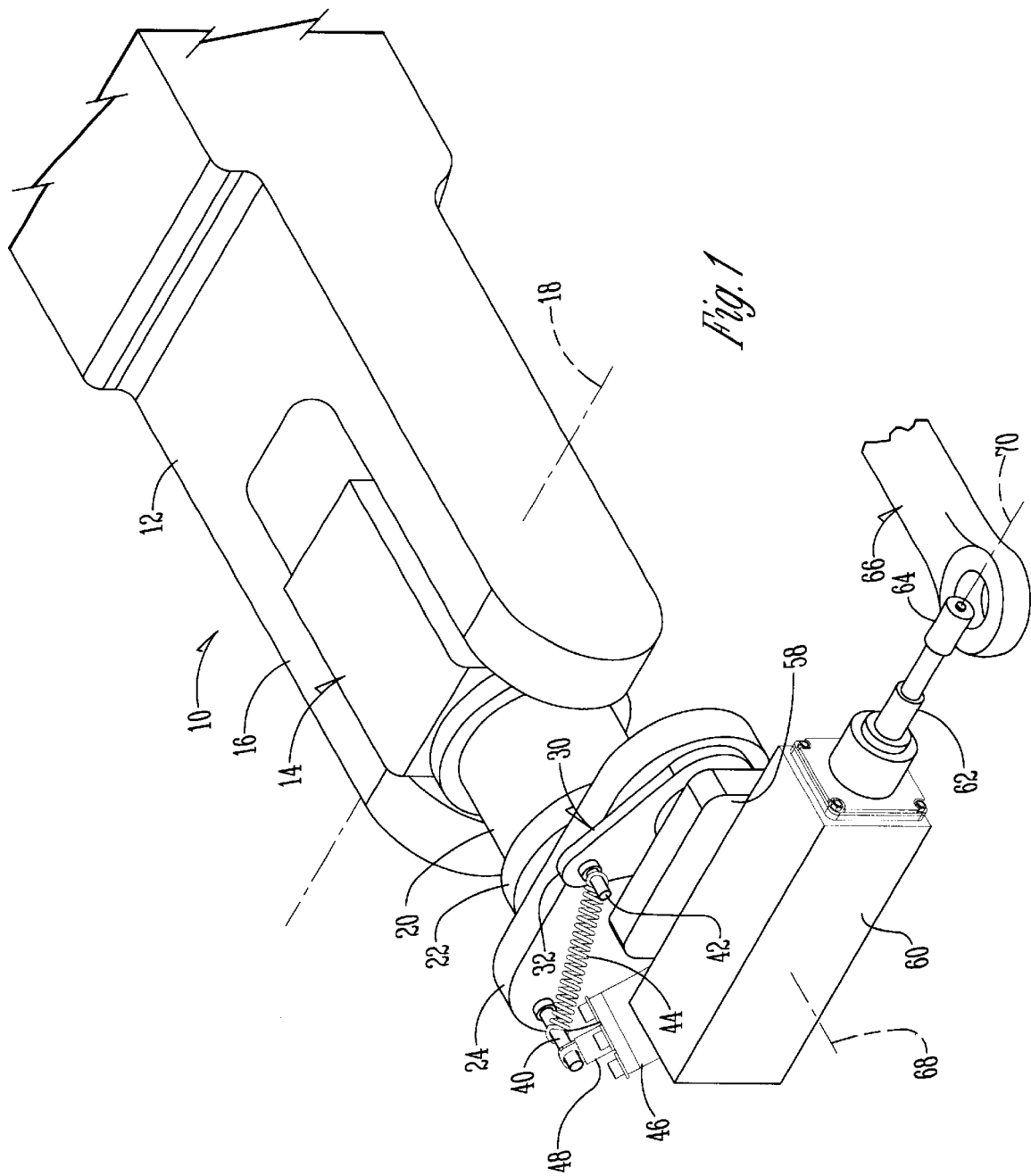
FIG. 1 is a perspective view of the zero gravity robotic system of the present invention.

Referring to FIG. 1 the numeral 10 generally designates a robotic arm comprising an upper arm member 12, and a lower arm member 14. Upper arm member 12 includes a clevis 16 which embraces lower arm member 14 and which is pivotally connected thereto for pivotal movement about an elbow axis 18.

Extending from lower arm member 14 is a wrist joint 20 which is connected to a main pivot plate 22, and which is capable of rotating main pivot plate 22 about a wrist axis (not shown) which is perpendicular to the elbow axis 18.

Figure 4:
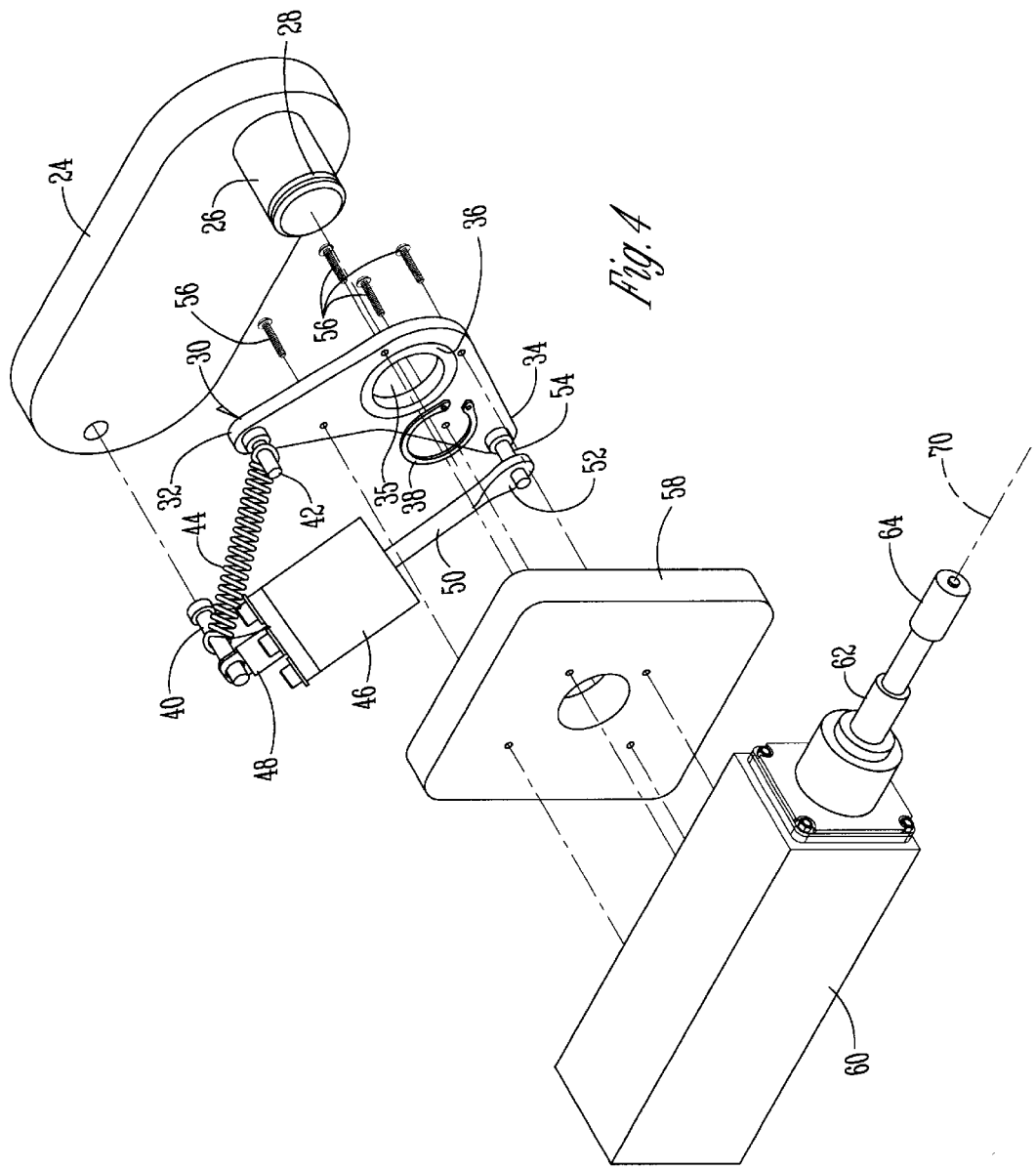
FIG. 4 is an exploded perspective view of the zero gravity system of the present invention.

A base plate 24 is operatively connected to main pivot plate 22 and is adapted to rotate in unison therewith. Base plate 24 includes a motor pivot pin 26 (FIG. 4) extending from one of its faces. Pin 26 includes a retaining groove 28 adjacent its outer distal end.

A lever arm 30 includes an upper lobe 32 and a lower lobe 34 and a pivot hole 35 extending therethrough. A ring bearing 36 is mounted within pivot hole 35 and provides pivotal mounting of the lever arm 30 over the motor pivot pin 26. A retaining ring 38 attaches the lever arm 30 to the motor pivot pin 26 so that the lever arm 30 may rotate on main pivot pin 26.

The base plate 24 includes a base plate anchor pin 40 on one end thereof. The lever arm 30 includes on its upper lobe 32 a lever arm spring pin 42. A spring 44 is attached at its opposite ends to pins 40, 42, and yieldably urges the rotation of lever arm 30 in a counterclockwise direction (as viewed in FIG. 4).

A cylinder 46 includes a cylinder clevis 48 which is pivotally mounted to base plate anchor pin 40. Cylinder 46 also includes a cylinder rod 50 extending therefrom and having a rod clevis 52 on its outer end. Clevis 52 is pivotally mounted to the lower lobe 34 of lever arm 30 by means of a clevis pin 54.

A plurality of motor bolts 56 extend through the lever arm 30 and also through a motor mounting plate 58 which is operatively attached to a motor 60. This secures the motor 60 to the lever arm 30 for rotation in unison therewith. Motor 60 includes an arbor 62 and a brush 64.

Of particular importance to the present invention is the mounting of the motor in such a position relative to the longitudinal axis of motor pivot pin 26 so that the longitudinal axis of motor pin 26 passes through the center of gravity of the combined tool 64 and motor 60. By virtue of this arrangement the motor 60 rotates about a motor axis 68 provided by the pin 26, and that motor axis 68 passes through the center of gravity of the combination of the motor 60 and the tool 64. The motor 60 is adapted to rotate the tool 64 about a tool axis 70.

In operation the motor 60 is actuated to rotate the tool 64 about its tool axis 70. The robot arm 10 moves the tool in close proximity to a work piece 66. Then the cylinder 46 is actuated to rotate the motor 60 and the lever arm 30 about the motor axis 68. This brings the brush 64 into engagement with the work piece 66 and causes the deburring function.

As can be seen by a comparison of FIGS. 2A–2B and FIGS. 3A–3B, the present invention neutralizes the effect of gravity on the force at which the brush 64 engages the work piece 66.

Figure 3A:
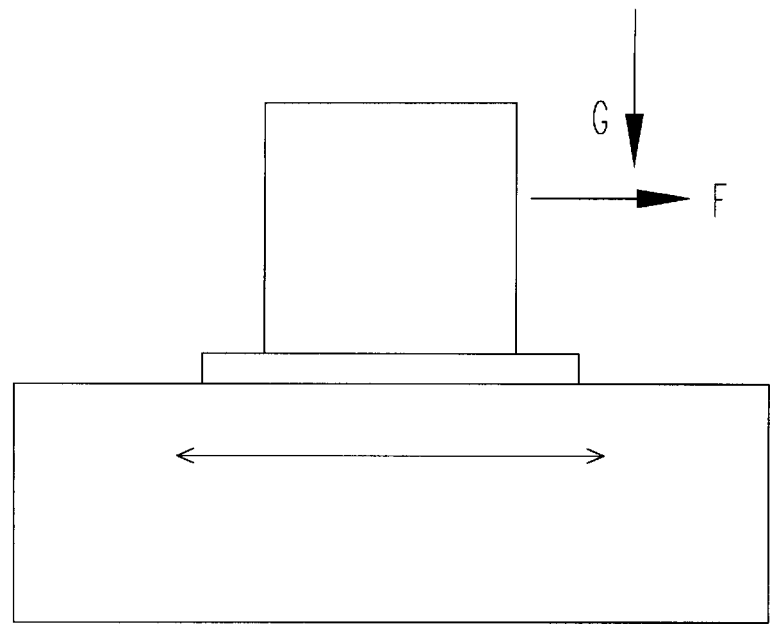
FIGS. 3A and 3B are schematic views illustrating a prior art linear slide device oriented at a horizontal and at a 30° orientation respectively.
Figure 3B:
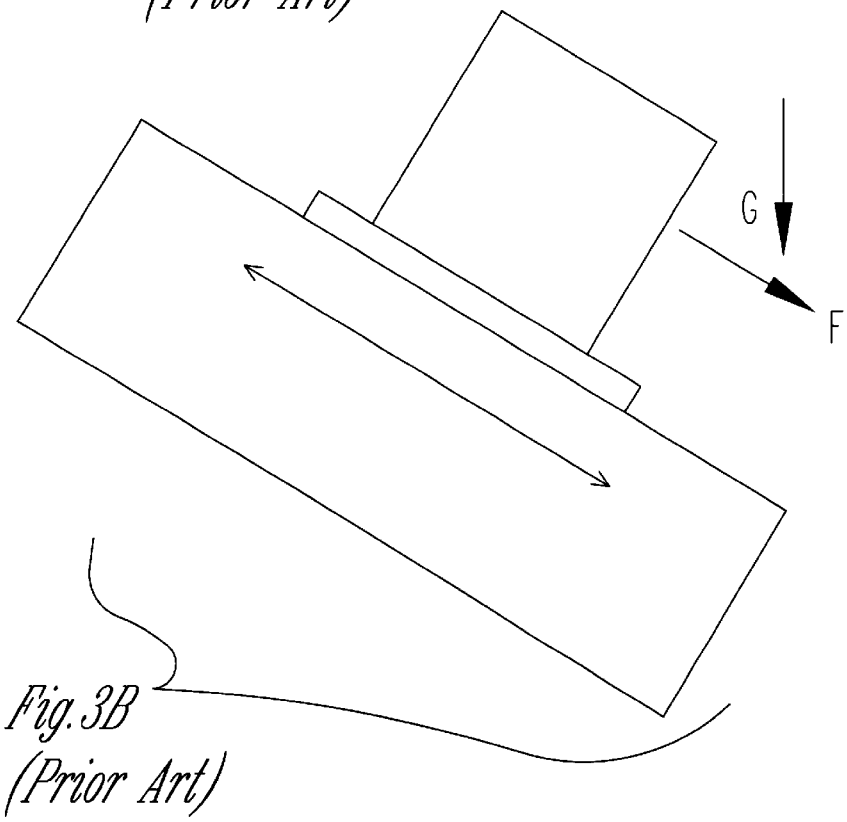

As previously explained FIGS. 3A and 3B illustrate that when a linear slide tool is in a horizontal orientation gravity has negligible effect. However, when the tool is angled the effect of gravity is to add to the pressure force by an amount equal to the force of gravity times the sign of the angle of orientation.

Figure 2A:
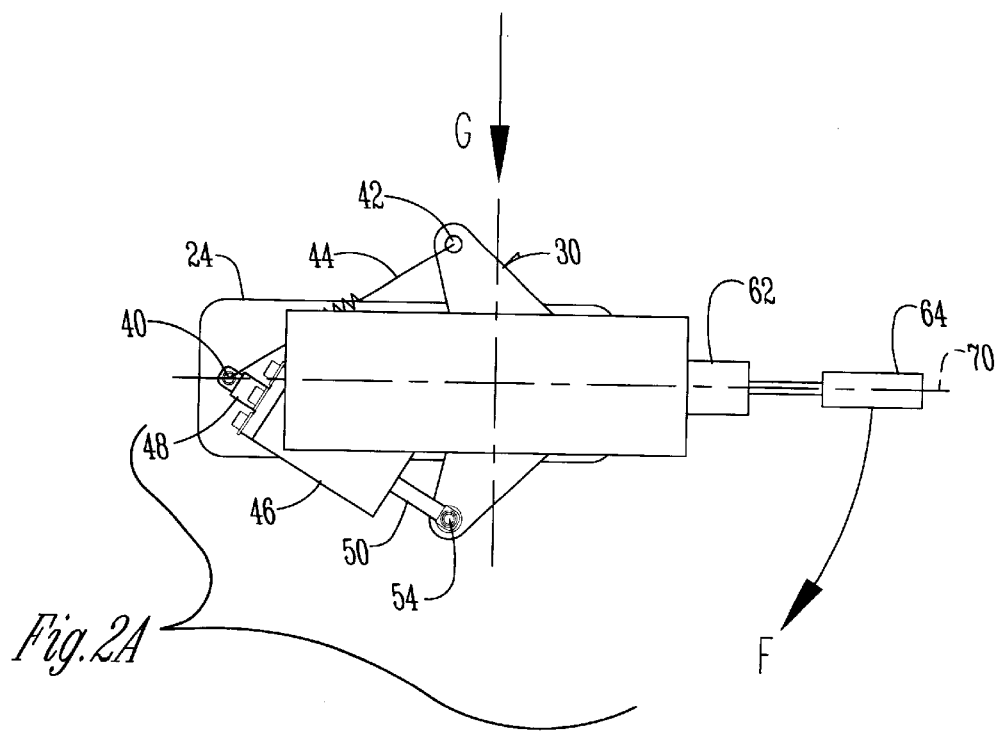
FIGS. 2A and 2B are schematic views showing the operation of the zero gravity system in a horizontal orientation and at a 45° orientation respectively.
Figure 2B:
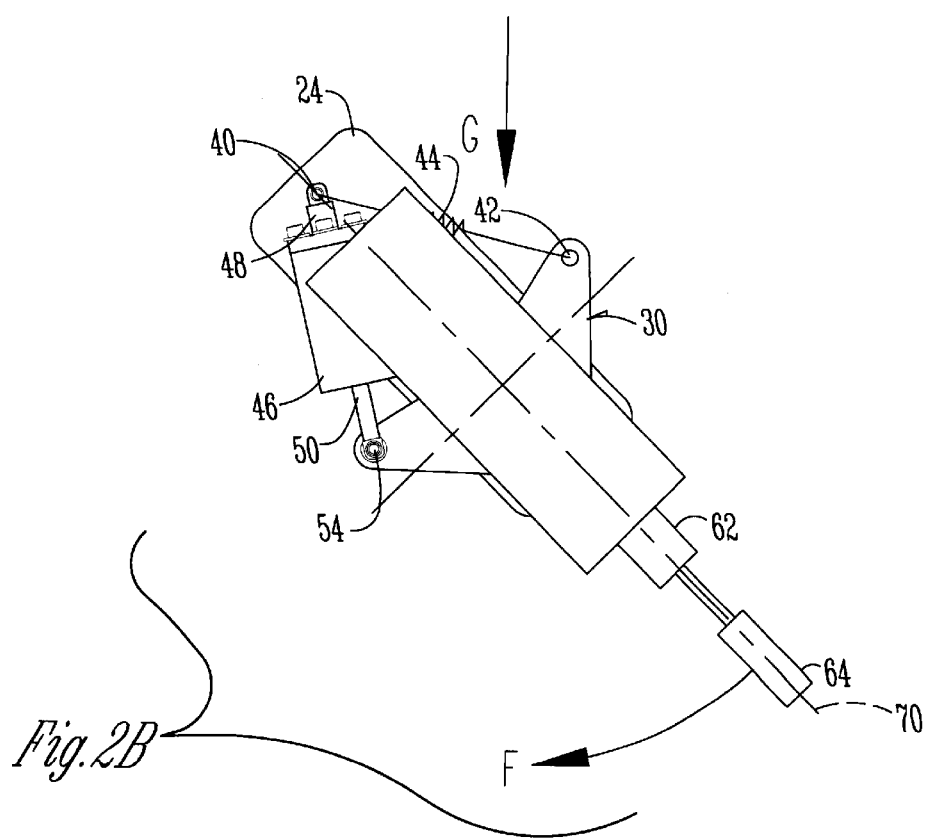

In FIGS. 2A and 2B however, the force F is not affected by gravity regardless of the orientation of the tool. This is because the motor pivots about motor axis 68 which coincides with the center of gravity of the tool and the motor. The cylinder 46 and its counterbalance spring 44 control the rotational force applied to the tool 64. The cylinder 46 is preferably a pneumatic cylinder although other types of prime movers could be used. The advantage of using a pneumatic cylinder however, is that the air pressure can be varied to vary the force applied between the brush 64 and the work piece 66.

In the preferred embodiment the robot 10 is shown holding the tool 64 and moving the tool 64 into contact with the work piece 66. However, the reverse arrangement can also be used with the robot holding the work piece and moving the work piece to the zero gravity mounting of motor 60 and tool 64.

In the drawings and specification there has been set forth a preferred embodiment of the invention, and although specific terms are employed, these are used in a generic and descriptive sense only and not for purposes of limitation, Changes in the form and the proportion of parts as well as in the substitution of equivalents are contemplated as circumstances may suggest or render expedient without departing from the spirit or scope of the invention as further defined in the following claims.

What is claimed is:

1. In combination:
    a robotic arm having a distal end;
    a motor having a rotatable arbor and a tool mounted to said arbor for rotation therewith about a tool axis, said motor and said tool having in combination a center of gravity;
    pivot mechanism connecting said motor and said tool to said distal end of said robotic arm for rotation about a motor axis which passes through said center of gravity of said motor and said tool;
    a prime mover connected to said distal end of said robotic arm and to said pivot mechanism for creating a rotational force to cause pivotal movement of said motor about said motor axis, whereby the force of gravity has negligible effect upon said rotational force regardless of the orientation of said motor with respect to gravity.

2. A combination according to claim 1 wherein said tool axis is oriented perpendicular to said motor axis.

3. A combination according to claim 2 wherein said pivot mechanism comprises a lever member pivotally connected to said distal end of said robotic arm for rotation about said motor axis, said lever member being attached to said motor.

4. A combination according to claim 3 wherein said prime mover is a fluid cylinder having an extensible rod.

5. A combination according to claim 4 wherein a spring is attached to said pivot mechanism and said distal end of said robotic arm, said spring providing a counterbalancing force to the force exerted by said fluid cylinder and said extensible rod.

6. The combination of claim 1 wherein the prime mover pivots the tool into engagement with the work piece.

7. A method for minimizing the effect of gravity on the force at which a robotic arm applies a tool to a work piece, said method comprising:
    rotatably mounting a motor having a work tool thereon to the distal end of a robotic arm for rotation about a motor axis which passes through a center of gravity the combination of said motor and said tool;
    applying a predetermined rotational force to said motor and said work tool to cause said motor and said work tool to rotate about said motor axis, whereby the passing of said motor axis through said center of gravity will cause gravity to have a negligible effect upon said predetermined rotational force regardless of the orientation of said motor and said tool with respect to gravity.

8. A method according to claim 6 and further comprising using said predetermined rotational force to move said tool into engagement with said work piece, and controlling the magnitude of said predetermined rotational force to control the pressure at which said tool engages said work.

9. A method according to claim 8 and further comprising using said motor to rotate said tool about a tool axis while said tool is in engagement with said work piece.

10. A method according to claim 8 and further comprising applying said pressure of said tool against said work piece in a direction perpendicular to said tool axis.

11. The method of claim 7 wherein the rotational force pivots the tool into engagement with the work piece.

12. A robotic system for performing work on a work piece, comprising:
    a robotic arm;
    a motor pivotally mounted on the arm for rotation about a pivot axis;
    a tool mounted on the motor said motor and said tool having in combination a center of gravity;
    a prime mover operatively extending between the arm and the motor to pivot the motor about the pivot axis; and the pivot axis extending in close proximity to the center of gravity.

13. The robotic system of claim 10 wherein the pivot axis passes through the center of gravity.

14. The robotic system of claims 12 wherein the motor and tool pivot in an angular orientation with respect to the work piece.

15. The robotic system of claim 12 further comprising a lever arm pivotally mounted on the robotic arm and connected to the motor, wherein the prime mover has opposite ends connected to the robotic arm and the lever arm, respectively.

16. The robotic system of claim 15 wherein the prime mover is a cylinder with an extensible and retractable rod.

17. The robotic system of claim 12 further comprising a spring to normally bias the motor and tool to an inoperative position.

18. The robotic system of claim 12 wherein the tool includes an axis of rotation substantially perpendicular to the pivot axis.

19. The robotic system of claim 12 wherein the prime mover pivots the tool into engagement with the work piece.

* * * * *